United States Patent
Karp et al.

(10) Patent No.: US 7,191,430 B2
(45) Date of Patent: Mar. 13, 2007

(54) PROVIDING INSTRUCTION EXECUTION HINTS TO A PROCESSOR USING BREAK INSTRUCTIONS

(75) Inventors: Alan H. Karp, Palo Alto, CA (US); Rajiv Gupta, Los Altos, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 600 days.

(21) Appl. No.: 09/963,270

(22) Filed: Sep. 24, 2001

(65) Prior Publication Data

US 2003/0061598 A1 Mar. 27, 2003

(51) Int. Cl.
G06F 9/44 (2006.01)

(52) U.S. Cl. ...................................................... 717/129

(58) Field of Classification Search ................. 717/127, 717/131, 134, 138, 139
See application file for complete search history.

(56) References Cited

U.S. PATENT DOCUMENTS

| | | | | |
|---|---|---|---|---|
| 4,910,663 A * | 3/1990 | Bailey | ............................ | 714/34 |
| 5,377,336 A * | 12/1994 | Eickemeyer et al. | ......... | 712/207 |
| 5,704,053 A * | 12/1997 | Santhanam | .................. | 717/158 |
| 6,134,710 A * | 10/2000 | Levine et al. | ................ | 717/158 |
| 6,195,792 B1 * | 2/2001 | Turnbull et al. | ............. | 717/110 |
| 6,351,844 B1 * | 2/2002 | Bala | ............................ | 717/128 |
| 6,516,401 B2 * | 2/2003 | Fukuhisa et al. | ............ | 711/218 |
| 6,560,693 B1 * | 5/2003 | Puzak et al. | .................. | 712/207 |
| 6,634,024 B2 * | 10/2003 | Tirumalai et al. | ............ | 717/161 |
| 6,647,485 B2 * | 11/2003 | Nguyen et al. | ................ | 712/23 |
| 6,799,263 B1 * | 9/2004 | Morris et al. | ................ | 712/207 |
| 6,820,193 B1 * | 11/2004 | Ostler et al. | ................. | 712/234 |
| 2002/0144062 A1 * | 10/2002 | Nakamura | .................... | 711/137 |
| 2003/0208745 A1 * | 11/2003 | Bystricky et al. | ............ | 717/129 |
| 2004/0107217 A1 * | 6/2004 | Hastings | ................... | 707/104.1 |
| 2004/0133747 A1 * | 7/2004 | Coldewey | .................... | 711/137 |

OTHER PUBLICATIONS

Grimsrud et al., "Multiple Prefetch Adaptive Disk Caching", IEEE Transactions on Knowledge and Data Engineering vol. 5, No. 1, Feb. 1993, pp. 88-103.*

* cited by examiner

*Primary Examiner*—Tuan Dam
*Assistant Examiner*—Andre R Fowlkes

(57) ABSTRACT

A computer system with mechanisms for providing hint instructions to a processor without altering object code instruction sequences. A computer system according to the present teachings includes elements for generating a hint instruction in response to a set of object code to be executed by the processor and for inserting a break instruction into the object code such that the break instruction causes the processor to obtain and execute the hint instruction. The present techniques for providing hint instructions to a processor may be used to adapt object code to a micro-architecture of the processor.

22 Claims, 5 Drawing Sheets

PROVIDING INSTRUCTION EXECUTION HINTS TO A PROCESSOR USING BREAK INSTRUCTIONS

BACKGROUND OF THE INVENTION

1. Field of Invention

The present invention pertains to the field of computer systems. More particularly, this invention relates to providing instruction execution hints to a processor.

2. Art Background

A computer system usually includes one or more processors which execute instructions. A processor may also be referred to as a central processing unit. A processor typically conforms to a macro-architecture which specifies an instruction set and a set of architectural registers, etc for code executed by the processor.

The code executed by a processor is usually referred to as object code. Typically, the object code executed by a processor is generated by a compiler. It is usually desirable to implement a compiler so that it generates object code in a manner that will enhance the speed at which the object code is executed by a processor. For example, it is common for a compiler to generate object code for a processor based on micro-architecture features of the processor such as on-chip caches, out-order processing capabilities, branch prediction capabilities, etc.

It is common for processor manufacturers to provide a family of processors that conform to a given macro-architecture. Processors in a family usually vary according to micro-architecture features such as on-chip caches, out-order processing capabilities, branch prediction capabilities, etc.

Unfortunately, object code which is compiled based on the micro-architecture features of one member of a processor family may suffer in performance when executed on another member of the family. For example, object code that includes pre-fetch instructions which are adapted to a processor having particular size of on-chip cache may hinder the performance of a processor having a smaller or non-existent on-chip cache.

Some prior systems use a re-compiler to translate object code which is optimized for one member of a processor family to another member of the processor family. Unfortunately, such object code translations usually alter object code sequences which can cause errors.

SUMMARY OF THE INVENTION

A computer system is disclosed with mechanisms for providing hint instructions to a processor without altering object code instruction sequences. A computer system according to the present teachings includes elements for generating a hint instruction in response to a set of object code to be executed by the processor and for inserting a break instruction into the object code such that the break instruction causes the processor to obtain and execute the hint instruction. The present techniques for providing hint instructions to a processor may be used to adapt object code to a micro-architecture of the processor.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
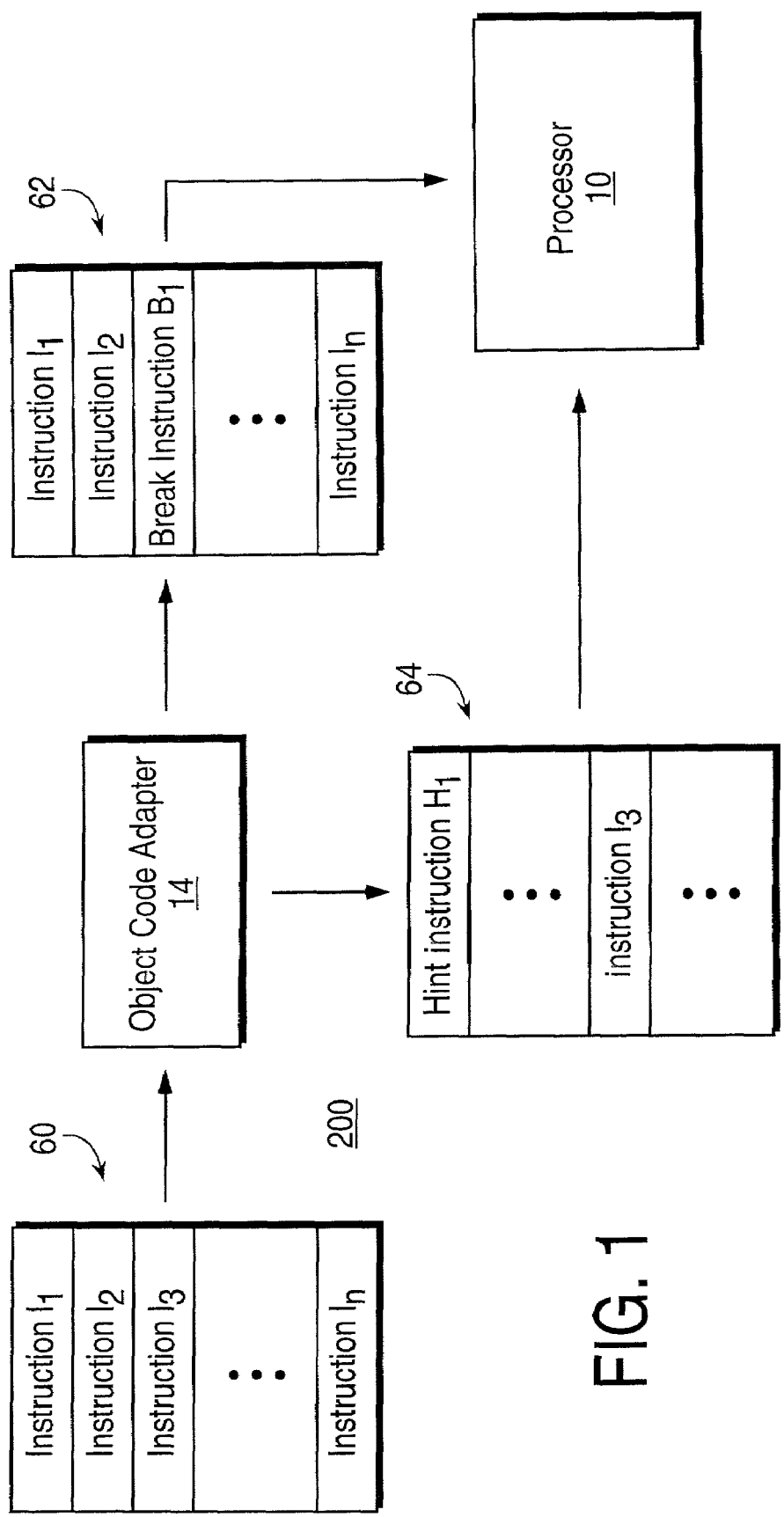
FIG. 1 illustrates a computer system which provides hint instructions to a processor according to the present teachings.

FIG. 1 illustrates a computer system 200 which provides hint instructions to a processor 10 according to the present teachings. The computer system 200 includes an object code adapter 14 which provides hint instructions to the processor 10 using a mechanism for handling break instructions which is built in to the processor 10. In one embodiment, the object code adapter 14 uses the present techniques to adapt a set of object code 60 to a micro-architecture of the processor 10.

The object code 60 includes a sequence of instructions $I_1$ through $I_n$ in object code according to the macro-architecture of the processor 10. The macro-architecture of the processor 10 defines an instruction set and a set of architectural registers and an address space, etc. for the processor 10. The micro-architecture of the processor 10 defines a set of capabilities and/or characteristics implemented in the processor 10 such as branch prediction capability, on-chip cache, instruction pipeline length, etc.

The object code adapter 14 adapts the object code 60 by providing hint instructions to the processor 10 in response to the micro-architecture of the processor 10 and the instructions $I_1$ through $I_n$ contained in the object code 60. In one embodiment, the object code adapter 14 generates a set of object code 62 and a set of hint code 64 in response to the object code 60.

The object code adapter 14 generates the object code 62 by inserting break instructions in place of selected instructions in the object code 60. For example, the object code adapter 14 replaces the instruction $I_3$ with a break instruction $B_1$.

The hint code 64 is code to be executed by the processor 10 when the break instruction $B_1$ is executed. The hint code 64 includes a hint instruction $H_1$ and the instruction $I_3$ that was replaced by the break instruction $B_1$ and may include additional instructions including additional hint instructions depending on the type of adaptation and/or optimization performed by the object code adapter 14. The hint code 64 may include a branch or return instruction to resume execution of the object code 62 depending on the implementation of the break mechanism in the processor 10.

One example of a hint instruction is a pre-fetch instruction that includes a pre-fetch address. The processor 10 executes a pre-fetch instruction by fetching a set of data from a memory using the pre-fetch address and writing the data into a cache associated with the processor 10. The cache may be separate from the processor 10 or may be integrated into the processor 10 as an on-chip cache.

Another example of a hint instruction is a branch prediction that specifies a likely result of a branch instruction in the sequence of instructions $I_1$ through $I_n$.

The hint instructions provided to the processor 10 using the present techniques may be adapted to the micro-architecture of the processor 10 to speed instruction execution. For example, if the micro-architecture of the processor 10 includes a relatively large on-chip cache then the object code adapter 14 may provide a relatively large number of pre-fetch hint instructions to the processor 10 and insert corresponding break instructions. Conversely, if the micro-architecture of the processor 10 includes a relatively small on-chip cache then the object code adapter 14 may provide relatively few pre-fetch hint instructions to the processor 10 because excessive pre-fetches would be more likely to cause undesirable evictions from the on-chip cache. In addition, if the micro-architecture of the processor 10 yields a relatively long latency on load memory instructions that miss a cache then the object code adapter 14 may provide a relatively large number of pre-fetch hint instructions to the processor 10.

In another example, if the micro-architecture of the processor 10 includes a relatively sophisticated on-chip branch prediction capability then the object code adapter 14 may not provide branch predictions to the processor 10. Conversely, if the micro-architecture of the processor 10 includes little or no branch prediction capability then the object code adapter 14 may liberally provide branch predictions to the processor 10. The object code adapter 14 may take into account the length of an instruction pipeline in the processor 10 when providing branch predictions because a relatively longer pipeline would cause a relatively large penalty on a branch mis-prediction.

The object code adapter 14 may be implemented in software or hardware or a combination of hardware/software. In one embodiment, the object code adapter 14 examines a sliding window of sequential instructions in the object code 60 when determining hint instructions.

The break mechanism of the processor 10 may be implemented in a wide variety of ways. For example, the processor 10 may be designed to branch to a predetermined address when a break instruction is executed and the object code adapter 14 stores the hint code 64 at that predetermined address. In some implementations, the predetermined address for code to be executed on a break instruction may be alterable using an internal register in the processor 10 possibly using a special instruction for the processor 10. The break mechanism of the processor 10 may rely on a branch instruction in the hint code 64 to resume normal execution or may include an internal mechanism for resuming normal execution.

In an alternative embodiment, the computer system 200 performs break operations at specified time intervals. For example, the object code adapter 14 may insert break instructions at predetermined time intervals or the processor 10 may break at predetermined time intervals. The breaks cause the processor 10 to branch to code that selects hint instructions based on the last address executed before a break.

Figure 2:
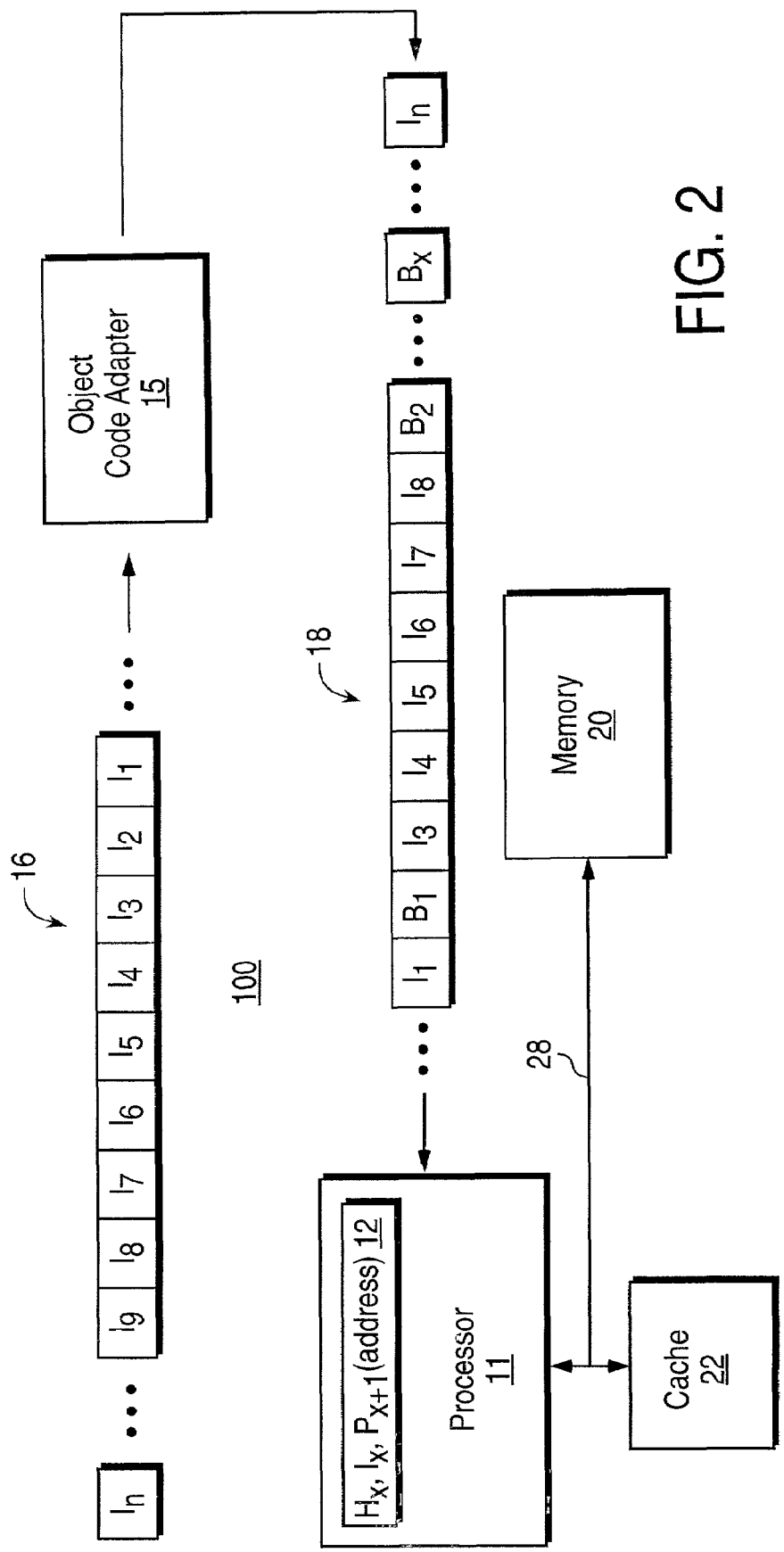
FIG. 2 shows another computer system which provides hint instructions to a processor according to the present teachings.

FIG. 2 illustrates a computer system 100 which includes an object code adapter 15 that provides hint instructions to a processor 11 according to the present teachings. The object code adapter 15 provides hint instructions to the processor 11 using a mechanism for handling break instructions which is built in to the processor 10 and a hint register 12 contained in the processor 10.

In one embodiment, the object code adapter 15 uses the present techniques to adapt a set of object code represented as an instruction stream 16 to a micro-architecture of the processor 11. The instruction stream 16 includes a sequence of instructions $I_1$ through $I_n$ in object code according to the macro-architecture of the processor 11.

The object code adapter 15 generates an instruction stream 18 for execution by the processor 11 by inserting a set of break instructions $B_1$ through $B_X$ into the instruction stream 16 in place of selected instructions. For example, the break instruction $B_1$ replaces the instruction $I_2$. The break instructions $B_1$ through $B_X$ cause the processor 11 to obtain and execute hint instructions which are provided via the hint register 12 in the processor 11.

In one embodiment, the hint register 12 holds a set of parameters including a hint instruction ($H_X$), an instruction ($I_X$), an address ($P_{X+1}$ (address)). The hint instruction $H_X$ is an instruction to be executed by the processor 11 in response to a next break instruction in the instruction stream 18. The instruction $I_X$ is the instruction in the instruction stream 16 that was replaced by the break instruction to which the hint instruction $H_X$ corresponds. The address $P_{X+1}$(address) is an address from which to obtain a next set of parameters $P_{X+1}$ to be loaded into the hint register 12.

The computer system 100 includes a memory 20 and a cache 22 which may hold a hint table of parameters $P_X$ to be loaded into the hint register 12. Table 1 shows an example hint table.

TABLE 1

| Table Address | $H_x$ | $I_x$ | $H_{x+1}$ (address) |
|---|---|---|---|
| address_1 | pre-fetch A0 | ADD R0, 1 | address_2 |
| address_2 | branch prediction T1 | MOV R3, R4 | address_3 |
| address_3 | pre-fetch A1 | LD R1 | address_4 |

In one embodiment, the object code adapter 15 examines a sliding window of sequential instructions in the instruction stream 16 when determining hint instructions. For example, at a particular point in time the object code adapter 15 may examine the instructions $I_1$ through $I_{10}$ and determine a hint instruction for one of the instructions $I_3$ through $I_{10}$ and insert the break instruction $B_1$ in place of the instruction $I_2$.

In some embodiments, the processor 11 includes multiple hint registers which may be used to provide hint instructions according to the present techniques.

Figure 3:
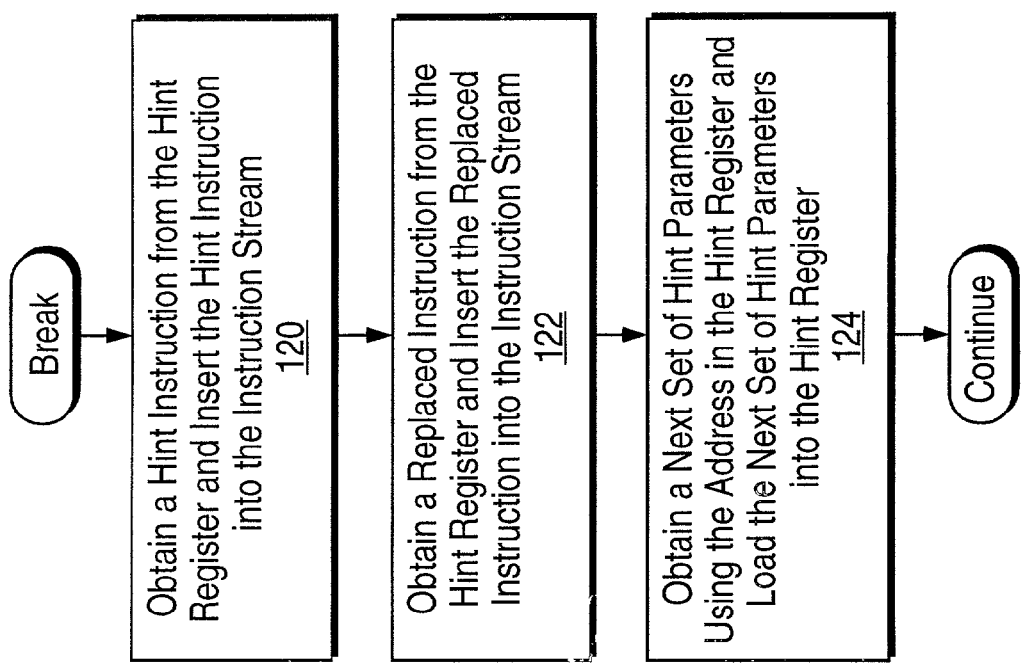
FIG. 3 shows the handling of a break instruction by a processor according to the present teachings.

FIG. 3 shows the handling of a break instruction by the processor 11. At step 120, the processor 11 obtains a hint instruction $H_X$ from the hint register 12 and inserts the hint instruction $H_X$ into the instruction stream to be executed. At step 122, the processor 11 obtains the replaced instruction $I_X$ from the hint register 12 and inserts it into the instruction stream to be executed. At step 124, the processor 11 obtains a next set of hint parameters $P_{X+1}$ using the address $P_{X+1}$ (address) contained in the hint register 12 and loads the next set of hint parameters $P_{X+1}$ into the hint register 12.

Figure 4:
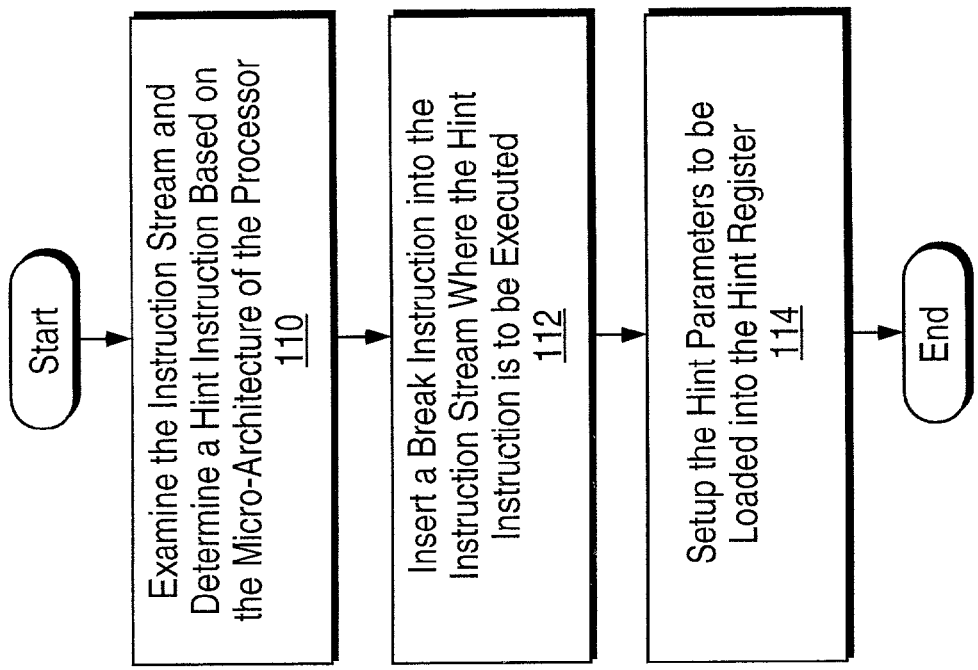
FIG. 4 shows a method for adapting an instruction stream to a micro-architecture of a processor according to the present teachings.

FIG. 4 shows a method for adapting the instruction stream 16 to the micro-architecture of the processor 11 according to the present teachings. At step 110, the object code adapter 15 examines the instruction stream 16 and determines a hint instruction based on the instruction stream 16 and the micro-architecture of the processor 11.

For example, the object code adapter 15 may detect a branch instruction in the instruction stream 16 at step 110. In addition, the micro-architecture of the processor 11 may include no branch prediction capability. In response, the hint instruction determined at step 110 may be a branch prediction for the branch instruction detected at step 110. The object code adapter 15 may determine the branch prediction in any known manner using optimizations that may be performed on the instruction stream 16 at run-time.

In another example, the object code adapter 15 may detect a load memory instruction in the instruction stream 16 at step 110 wherein the data for the load memory instruction is not available in the cache 22. In addition, the micro-architecture of the processor 11 may include a relatively large on-chip cache. In response, the hint instruction determined at step 110 may be a pre-fetch instruction having the memory address of the load memory instruction detected at step 110.

At step 112, the object code adapter 15 inserts a break instruction into the instruction stream 18 at a point where the hint instruction determined at step 110 is to be executed. For example, if the instruction $I_n$ is a load memory instruction then the object code adapter 15 may insert the break instruction $B_n$ far enough ahead of the load memory instruction $I_n$ so that the pre-fetch operation executed when the break instruction $B_n$ is encountered by the processor 11 will be completed by the time the processor 11 executes the load memory instruction $I_n$. In another example, if the instruction $I_n$ is a branch instruction then the object code adapter 15 may insert the break instruction $B_n$ several cycles ahead of the branch instruction $I_n$ to provide the processor 11 with the corresponding branch prediction hint.

At step 114, the object code adapter 15 sets up the hint parameters $P_X$ consisting of the hint instruction $H_X$ determined at step 110, the instruction $I_X$ from the instruction stream 16 that was replaced by the hint instruction $H_X$ at step 110 when constructing the instruction stream 18, and an address $P_{X+1}$ (address) for a next set of hint parameters $P_{X+1}$. The hint parameters $P_X$ may be written into the memory 20 at an address pointed to by the current $P_{X+1}$ (address) value in the hint register 12. The hint parameters $P_X$ set up at step 114 will be loaded into the hint register 12 on the break instruction that occurs in the instruction stream 18 before the break instruction inserted at step 112. For example, if the break instruction $B_n$ is inserted at step 112 then the hint parameters $P_X$ set up at step 114 will be loaded into the hint register 12 when the processor 11 encounters the break instruction $B_{n-1}$.

The contents of the hint register 12 may be initialized by the object code adapter 15. For example, the processor 11 may be implemented with an instruction for loading the hint register 12 and the object code adapter 15 may insert that instruction with appropriate parameters into the instruction stream 18 before inserting break instructions.

Figure 5:
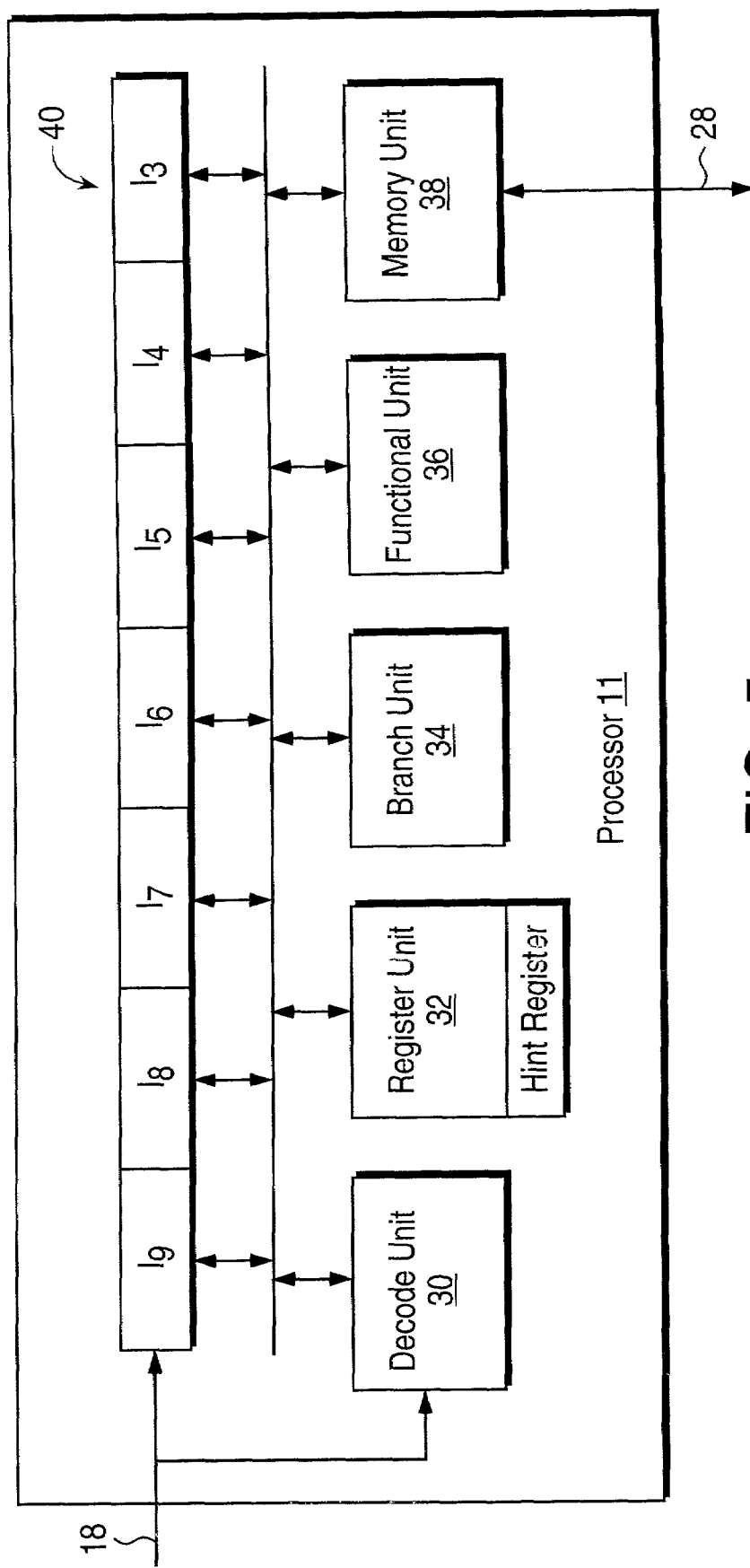
FIG. 5 shows an example micro-architecture for a processor.

FIG. 5 shows an example micro-architecture for the processor 11. The processor 11 in this embodiment includes an instruction pipeline 40 and a set of functional units 30–38 which perform hardware operations associated with instruction execution. For example, the decode unit 30 performs instruction decode operations, the register unit 32 performs register operations and includes a set of registers including the hint register 12, and the memory unit 38 performs load memory an pre-fetch operations. The branch unit 34 determines updated instruction pointers by resolving branch instructions.

The instruction pipeline 40 holds the instructions $I_3$ through $I_8$ in corresponding stages of instruction execution.

The processor 11 replaces the break instruction $B_2$ which was received in the instruction stream 18 with the instruction $I_9$ obtained from the hint register 12. The instruction $I_9$ was stored in the hint register 12 as the replaced instruction $I_X$. In this embodiment, the decode unit 30 detects the break instruction $B_2$ and obtains the instruction $I_9$ from the hint register and places it in the first stage of the pipeline 40.

Figure 6:
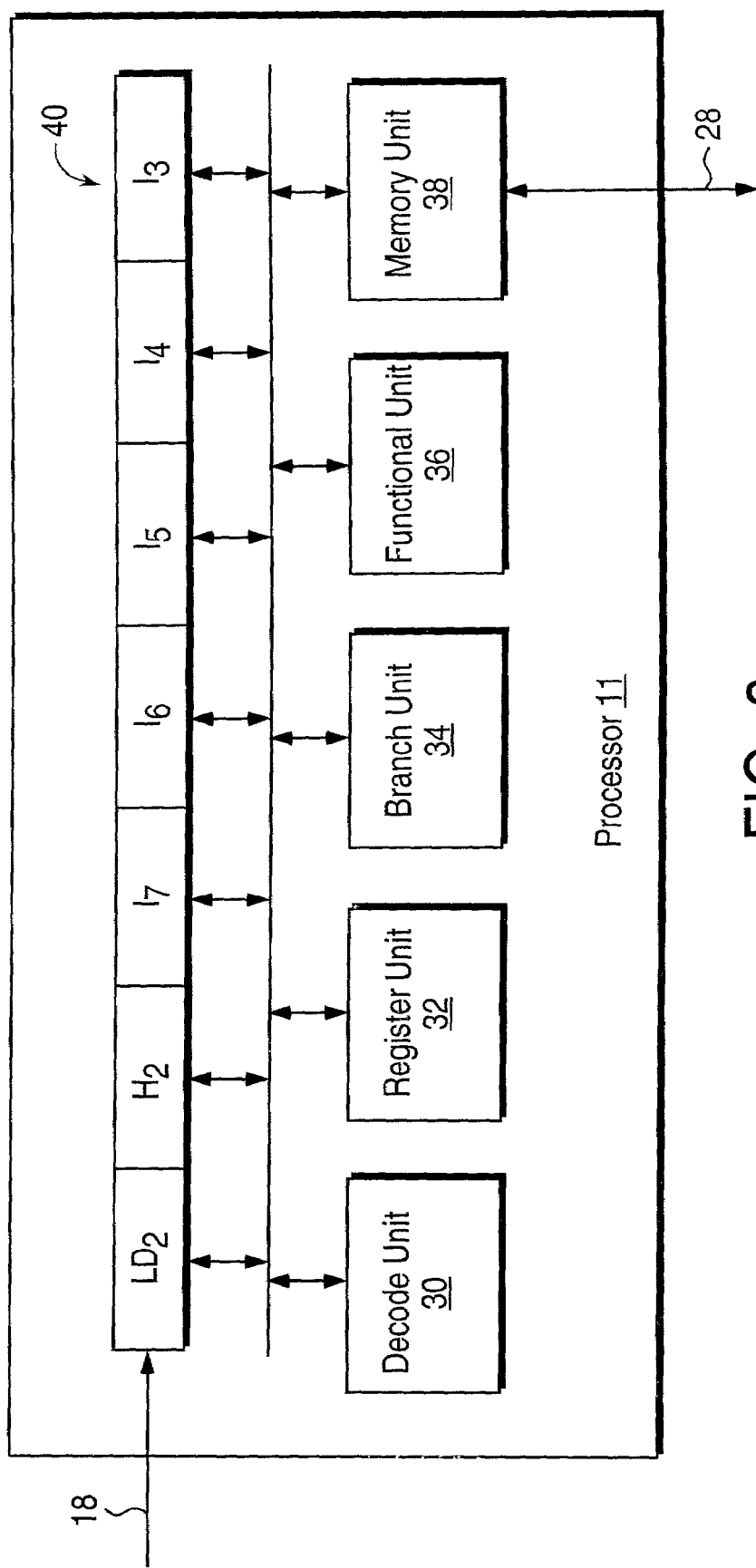
FIG. 6 shows an instruction pipeline one processor cycle after a break instruction is detected.

FIG. 6 shows the instruction pipeline 40 one processor cycle after the break instruction $B_2$ is detected. The break instruction $B_2$ is replaced by the hint instruction $H_2$ obtained from the hint register 12 and a load memory instruction $LD_2$ having a memory address obtained from the hint register 12 is inserted into the instruction pipeline 40 to read the next hint instruction/address pair for the hint register 12. The load memory operation $LD_2$ is performed by the memory unit 38. If the hint instruction $H_2$ is a pre-fetch operation then it is performed by the memory unit 38. If the hint instruction $H_2$ is a branch prediction then it is used by the branch unit 34 when generating an updated instruction pointer for the subsequent branch instruction in the instruction stream 18.

In another alternative embodiment, two special types of break instructions are used to provide hints to the processor 11 and the hint register 12 is used to hold target addresses for instruction execution. When a first special type of break instruction is encountered, the processor 11 branches to a target address specified in the hint register 12 (which points to hint code set up by the object code adapter 15) and inserts the address of the instruction that caused the break into the hint register 12. The processor 11 then executes the desired hint instructions included in the hint code. The last instruction in the hint code is a second special type of break instruction which causes an address for a next set of hint code to be loaded into the hint register 12.

In yet another alternative embodiment, the hint register 12 holds three addresses including the address of a first set of hint code and the address of the first break instruction in an instruction stream to be executed. When a break instruction is encountered, the processor 11 branches to the address of the first set of hint code contained in the hint register 12 and moves the address of the break instruction into the first position in the hint register 12. The hint code when executed then inserts the addresses of a next set of hint code and a next break instruction into the second and third positions of the hint register 12. When a special break instruction is encountered in the first set of hint code, the processor 11 moves the second two addresses in the hint register 12 to the first two positions in the hint register 12 in preparation for the next break instruction.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for providing hint instructions to a processor, comprising:

generating hint code that includes (i) a hint instruction in response to a set of object code to be executed by the processor and (ii) a selected instruction to be removed from the set of object code;

replacing the selected instruction in the object code with a break instruction such that the break instruction causes the processor to obtain and execute both the hint instruction and the selected instruction; and resuming execution of the object code without changing addresses of subsequent instructions in the object code.

2. The method of claim 1, wherein the hint code further includes (iii) an instruction for the processor to resume execution of the set of object code.

3. The method of claim 1, wherein the hint code adapts the set of object code so the set of object code can be executed by the processor.

4. The method of claim 1, further comprising loading the hint instruction into a hint register such that the break instruction causes the processor to obtain the hint instruction from the hint register and execute the hint instruction.

5. The method of claim 4, wherein the step of loading the hint instruction into a hint register further includes the step of loading the selected instruction into the hint register such that the break instruction causes the processor to obtain the selected instruction from the hint register and execute the selected instruction.

6. The method of claim 4, wherein the step of loading the hint instruction into a hint register further includes the step of loading an address into the hint register such that the break instruction causes the processor to load the hint register using the address.

7. The method of claim 1, further comprising determining the hint instruction in response to a micro-architecture of the processor.

8. A computer system, comprising:
object code adapter that determines a hint instruction that includes a branch prediction instruction in response to a set of object code and that inserts a break instruction into the object code, the break instruction replacing a selected instruction in the object code;
processor that executes the object code such that the break instruction causes the processor to obtain and execute the hint instruction, obtain and execute the removed selected instruction, and then resume execution of the object code without changing addresses of subsequent instructions in the object code.

9. The computer system of claim 8, wherein the object code adapter generates a set of hint code which includes the hint instruction and the selected instruction.

10. The computer system of claim 9, wherein the processor branches to the hint code when executing the break instruction.

11. The computer system of claim 8, wherein the processor includes a hint register for holding the hint instruction such that the processor obtains the hint instruction from the hint register and executes the hint instruction in response to the break instruction.

12. The computer system of claim 11, wherein the hint register holds the selected instruction such that the processor obtains the selected instruction from the hint register and executes the selected instruction in response to the break instruction.

13. The computer system of claim 11, wherein the hint register holds an address such that the processor loads the hint register using the address in response to the break instruction.

14. The computer system of claim 8, wherein the object code adapter determines the hint instruction in response to a micro-architecture of the processor.

15. A method, comprising:
providing a sequence of instructions in object code;
replacing a selected instruction in the object code with a break instruction;
executing the break instruction to cause a processor to retrieve hint code;
executing, by the processor, the hint code, wherein the hint code includes (i) a hint instruction, (ii) the selected instruction, and (iii) an instruction to resume execution of the object code; and
resuming, upon execution of the instruction to resume, execution of the object code without changing addresses of subsequent instructions in the object code.

16. The method of claim 15 wherein the hint instruction includes a pre-fetch instruction that causes the processor to fetch data from memory and write the data into a cache.

17. The method of claim 15 wherein the hint instruction includes a branch prediction instruction.

18. The method of claim 15 further comprising:
providing plural hint instructions;
adapting a number of hint instructions to increase instruction execution of the processor.

19. The method of claim 15 further comprising:
providing plural hint instructions;
adapting a number of hint instructions depending on a cache size of the processor.

20. The method of claim 15 further comprising:
providing plural different types of hint instructions, wherein a type of hint instruction provided to the processor depends on functional capabilities of the processor.

21. The method of claim 15 wherein a break instruction replaces a selected instruction at predetermined intervals.

22. The method of claim 15 wherein executing the break instruction further comprises causing the processor to branch to a predetermined address having the hint code.

* * * * *